(12) United States Patent
Chatterjee et al.

(10) Patent No.: US 8,108,580 B1
(45) Date of Patent: Jan. 31, 2012

(54) LOW LATENCY SYNCHRONOUS REPLICATION USING AN N-WAY ROUTER

(75) Inventors: Paresh Chatterjee, Fremont, CA (US); Loganathan Ranganathan, Fremont, CA (US); Narayanan Balakrishnan, Milpitas, CA (US); Srikumar Subramanian, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 934 days.

(21) Appl. No.: 12/104,129

(22) Filed: Apr. 16, 2008

Related U.S. Application Data

(60) Provisional application No. 60/923,867, filed on Apr. 17, 2007.

(51) Int. Cl.
  *G06F 13/12* (2006.01)
  *G06F 13/00* (2006.01)
(52) U.S. Cl. .......................... 710/74; 711/114
(58) Field of Classification Search .................. 710/74; 711/114
  See application file for complete search history.

(56) References Cited

U.S. PATENT DOCUMENTS

| | | | |
|---|---|---|---|
| 4,849,978 A | 7/1989 | Dishon et al. | |
| 4,942,579 A | 7/1990 | Goodlander et al. | |
| 5,257,367 A | 10/1993 | Goodlander et al. | |
| 5,524,204 A | 6/1996 | Verdoorn, Jr. | |
| 5,678,061 A | 10/1997 | Mourad | |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,907,849 A | 5/1999 | Dias et al. | |
| 6,098,128 A | 8/2000 | Velez-McCaskey et al. | |
| 6,105,122 A | 8/2000 | Muller et al. | |
| 6,108,748 A | 8/2000 | Ofek et al. | |
| 6,128,654 A | 10/2000 | Runaldue et al. | |
| 6,282,619 B1 | 8/2001 | Islam et al. | |
| 6,289,398 B1 | 9/2001 | Stallmo et al. | |
| 6,502,166 B1 | 12/2002 | Cassidy | |
| 6,629,203 B1 * | 9/2003 | Humlicek | 711/114 |

(Continued)

OTHER PUBLICATIONS

U.S. Official Action dated Mar. 16, 2009 in U.S. Appl. No. 11/551,303.

(Continued)

*Primary Examiner* — Henry W. H. Tsai
*Assistant Examiner* — Hyun Nam
(74) *Attorney, Agent, or Firm* — McKeon, Meunier, Carlin & Curfman, LLC

(57) ABSTRACT

Technologies for efficient synchronous replication across heterogeneous storage nodes can provide the performance of high-speed storage units while leveraging low-cost and high-capacity backup storage units within the same system. The performance of low-cost, high-capacity hard disks may be improved by initially storing data into sequential physical locations. A sequential journal of I/Os may be used in a replicated secondary node to allow for rapid completion of I/Os. A separate background process can later scatter the sequentially logged I/O data into its proper location for storage. A programmable n-way router can be configured to route I/Os as needed to improve overall performance of the storage unit. A secondary node log device can also be used to provide continuous data protection (CDP). Lastly, packetizing together I/Os prior to delivery to a secondary node may reduce interrupts and context switches in the primary node, thereby improving performance of the storage system.

17 Claims, 8 Drawing Sheets

U.S. PATENT DOCUMENTS

| | | | |
|---|---|---|---|
| 6,826,711 | B2 | 11/2004 | Moulton et al. |
| 7,069,385 | B2 | 6/2006 | Fujimoto et al. |
| 7,089,448 | B2 * | 8/2006 | Hinshaw et al. ............ 714/6.12 |
| 7,155,466 | B2 | 12/2006 | Rodriguez et al. |
| 7,159,150 | B2 | 1/2007 | Kenchammana-Hosekote et al. |
| 7,231,493 | B2 | 6/2007 | Nguyen et al. |
| 7,315,958 | B1 | 1/2008 | Bridge, Jr. |
| 2002/0059540 | A1 | 5/2002 | Mann et al. |
| 2003/0088803 | A1 | 5/2003 | Arnott et al. |
| 2003/0105923 | A1 | 6/2003 | Bak et al. |
| 2003/0221063 | A1 | 11/2003 | Eguchi et al. |
| 2004/0073831 | A1 | 4/2004 | Yanai et al. |
| 2004/0088483 | A1 | 5/2004 | Chatterjee et al. |
| 2004/0250031 | A1 | 12/2004 | Ji et al. |
| 2004/0255189 | A1 | 12/2004 | Chu et al. |
| 2005/0091391 | A1 | 4/2005 | Burton et al. |
| 2005/0102551 | A1 | 5/2005 | Watanabe |
| 2005/0114350 | A1 | 5/2005 | Rose et al. |
| 2005/0273565 | A1 | 12/2005 | Hirakawa et al. |
| 2007/0254922 | A1 * | 11/2007 | Hiraiwa et al. ................ 514/338 |
| 2007/0271422 | A1 * | 11/2007 | Osaki ............................ 711/154 |
| 2008/0059734 | A1 * | 3/2008 | Mizuno ......................... 711/162 |

OTHER PUBLICATIONS

Intel (Publisher). "PRO/10 Adapter: Reducing Bottlenecks for Maximum Performance," 2004. URL: http://www.intel.com/support/network/adapter/pro100/sb/cs-010531.htm, 5 pages.

U.S. Official Action dated Mar. 20, 2009 in U.S. Appl. No. 11/551,291.
U.S. Official Action dated Oct. 5, 2009 in U.S. Appl. No. 11/551,291.
U.S. Official Action dated Aug. 17, 2009 in U.S. Appl. No. 11/551,303.
U.S. Official Action dated Jul. 8, 2009 in U.S. Appl. No. 11/551,311.
U.S. Official Action dated Dec. 28, 2009 in U.S. Appl. No. 11/551,311.
U.S. Official Action dated Apr. 30, 2009 in U.S. Appl. No. 11/695,854.
U.S. Official Action dated Oct. 14, 2009 in U.S. Appl. No. 11/695,854.
U.S. Official Action dated Dec. 23, 2008 in U.S. Appl. No. 11/551,311.
U.S. Appl. No. 11/551,291, filed Oct. 20, 2006, entitled "Providing Redundancy in a Storage System", Inventors: Chatterjee et al.
U.S. Appl. No. 11/551,303, filed Oct. 20, 2006, entitled "Background Movement of Data Between Nodes in a Storage Cluster," Inventors: Chatterjee et al.
U.S. Appl. No. 11/551,311, filed Oct. 20, 2006, entitled "Distributed Hot-Spare Storage in a Storage Cluster", Inventors: Chatterjee et al.
U.S. Appl. No. 11/695,854, filed Apr. 3, 2007, entitled "Asynchronous Data Replication", Inventors: Chatterjee et al.
U.S. Official Action dated Jul. 28, 2008 in U.S. Appl. No. 11/551,303.
U.S. Official Action dated Jul. 22, 2010 in U.S. Appl. No. 11/551,311.
Notice of Allowance dated Mar. 28, 2011 in U.S. Appl. No. 11/551,291.

* cited by examiner though the disk from the cluster's operation
LOW LATENCY SYNCHRONOUS REPLICATION USING AN N-WAY ROUTER

CROSS-REFERENCE TO RELATED APPLICATIONS

This application claims the benefit of U.S. provisional patent application No. 60/923,867, filed on Apr. 17, 2007, and entitled "Novel Method of Using N-Way Router to Implement High Performance, Low Latency Synchronous Replication from SAS to SATA Storage Units" which is expressly incorporated herein by reference in its entirety.

BACKGROUND

A virtualized cluster is a cluster of different storage nodes that together expose a single storage device. Input/Output operations ("I/Os") sent to the cluster are internally re-routed to read and write data to the appropriate locations. In this regard, a virtualized cluster of storage nodes can be considered analogous to collection of disks in a Redundant Array of Inexpensive Disks ("RAID") configuration, since a virtualized cluster hides the internal details of the cluster's operation from initiators and presents a unified device instead.

In a virtualized cluster, data may also be replicated or mirrored between nodes such that copies of the data are stored in two or more locations. Such replication can improve data availability because the data may still be available at a second node should a first node become unavailable because of hardware failure, network congestion, link failure, or otherwise. In a mirrored system, the data on each node is duplicated to other storage units. Duplication can be made at the same time as an initial write I/O or it can be done later, in a background operation. When the duplication is done at the same time as an initial write, it is called a synchronous duplication. In contrast, a later duplication performed in the background may be called an asynchronous duplication. In either synchronous or asynchronous mirroring systems, one of the main requirements of operation is to maintain the consistency of data across all of the mirror nodes.

An advantage of synchronous mirroring is that the secondary node is always synchronized with the primary node. If there is a disaster in the primary node at any time, the secondary node can take over without loss in data. The amount of data lost during such a recovery can be captured by a metric referred to as the RPO (Recovery Point Objective). Similarly, the amount of down-time due to a disaster can be captured by a metric referred to as the RTO (Recovery Time Objective). RTO generally arises from the delay in the secondary node taking over from the primary node. RPO and RTO are two important criteria for determining the nature of replication to be used.

A system administrator will generally prefer to minimize RPO and RTO, but there are practical limitations to consider. For example, when two mirrored nodes offer similar performance and are connected by a fast data link, synchronous operation is possible. This is because both nodes can complete a write I/O while the initiator is waiting for acknowledgment of the I/O. The delay is generally similar to the delay associated with only the primary write I/O. This is possible because the operating speeds of the two nodes are closely matched and the data link between the two nodes is relatively fast.

In a heterogeneous storage network having mixed node performance, synchronous replication may still fare poorly. This may even be so when the two nodes have a high speed link between them because the network has a mixture of high performance storage nodes and slower nodes. Generally, the slower nodes are using larger, slower physical disks as secondary (backup) nodes since such storage is generally lower in cost per unit of capacity. In one example of this, a storage network may have nodes with high-performance SAS (serially attached SCSI) disks attempting to replicate to backup storage nodes having slower SATA (serial advanced technology attachment) disks.

If a mixed, or heterogeneous, system attempts to operate in a synchronous replication mode, the performance of the entire system will typically degrade to that of the slower storage nodes. In such scenarios, the traditional approach would be to either use high-cost, high-performance nodes even as secondary nodes, or to switch over to asynchronous replication between the mixed nodes. The first option allows for continued use of synchronous replication mode and achieves the associated desirable RPO and RTO values, but increases costs. The second option allows the system to achieve higher speed performance without buying all high-speed storage nodes, but the cost is to sacrificing RPO and RTO performance by switching to asynchronous replication. Either way, there is a trade-off.

It is with respect to these considerations and others that the disclosure made herein is presented.

SUMMARY

Technologies are described herein for efficient synchronous replication across heterogeneous storage nodes. Through the utilization of the technologies and concepts presented herein, data replication can achieve the performance of high-speed storage units and, at the same time, leverage low-cost and high-capacity backup storage units within the same system. Additionally, the low RPO and RTO metrics of a synchronous replication system can be maintained. The performance of low-cost, high-capacity hard disks may be improved by initially storing data in sequential physical locations. When used in a replication secondary node, this can allow I/Os to be completed back to the initiator quickly. As time and resources become available, a background process can later scatter the sequentially logged I/O data into its proper location for storage.

Since some I/Os (such as those for logging or journaling) are naturally sequential, different modes of operation may be selected based on the nature of incoming I/Os. This can provide the desired performance for both sequential and random I/O loads. A programmable n-way router can be configured to route and handle I/Os as needed to improve overall performance of the storage unit. A secondary node sequential log can also be used to provide continuous data protection (CDP). Lastly, packetizing sequential I/Os together prior to delivery to a secondary node may reduce interrupts and context switches in the primary node, thereby improving overall performance of the storage system.

According to one aspect presented herein, the operation of low-cost, high-capacity hard disks may be improved by forcing data initially to be stored in sequential physical locations. Low-cost, high-capacity hard disks may be slower than high-speed hard disks. For example, SATA drives may be slower then SAS drives. However, a given low-cost, high-capacity hard disk may store data into sequential physical locations considerably faster than its normal random access performance would indicate. This can be due to positioning the data on the disk sequentially to substantially reduce the delay of head seek time between each write of random access data. When such a solution is used to write I/Os at a secondary node, the I/O can be completed back to the initiator more rapidly. At a later time, when resources become available, a background process can scatter the sequentially logged I/O data in the secondary node into its proper location for storage. I/Os can be logged synchronously in a sequential data store at the secondary node to improve transaction completion time, and then the logged I/Os can be scattered out to their appropriate random access locations in an asynchronous fashion.

Some applications, such databases and email systems, may use two types of underlying volumes, one that is the actual data volume and another that is a log volume. The log volume can employ a sequential log file to keep track of every transaction occurring on the data volume. Typical data volume I/Os can be random access loads. For example, an initiator executing the EXCHANGE mail server program from MICROSOFT CORPORATION may generally offer a load comprising 8 KB sized random I/Os. Different modes of operation for the storage server can be based on the nature of the I/Os offered to the server. This flexibility can provide the desired storage performance for both sequential and random I/O loads. For example, both log and data volume accesses can be handled together efficiently by directly performing database log I/Os while temporarily forcing data volume I/Os into a sequential journal (or log) at the secondary node.

According to another aspect presented herein, replicated storage nodes may use a programmable n-way router to route I/Os from different incoming sources to different outgoing destinations. For example, an n-way router in the secondary node may route incoming I/O traffic to a log volume via a journaling module. Programmable I/O routing through different modules can provide substantial simplification in configuring different storage solutions.

Yet another aspect presented herein provides for packetizing multiple outstanding small I/Os in to one large I/O. This could general occur in the primary prior to replication to the secondary. This approach can enable better storage performance by substantially reducing the number of interrupts and context switches that are associated with every I/O and replication operation.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
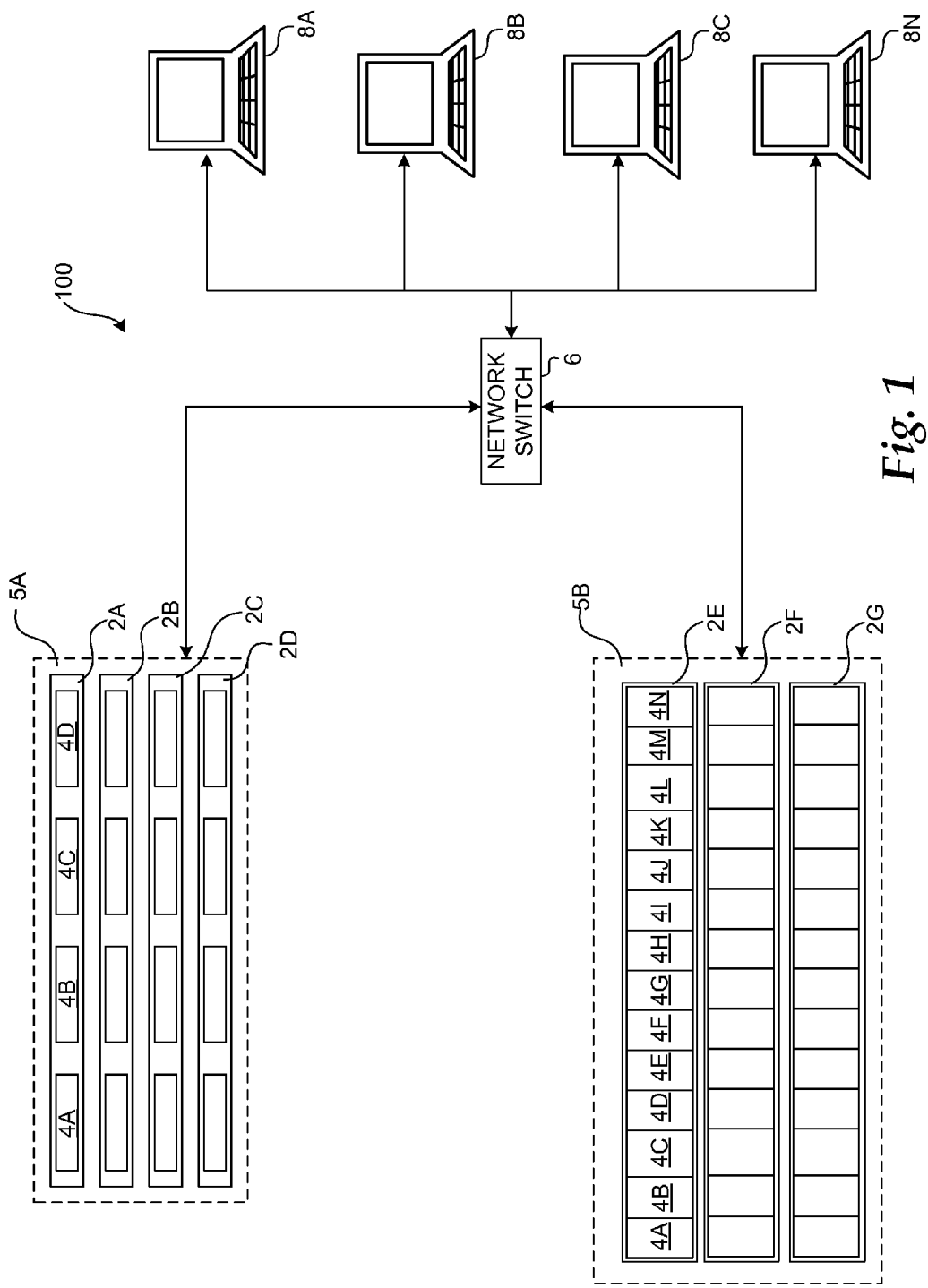
FIG. 1 is a network architecture diagram illustrating aspects of a storage system that includes several virtualized clusters according to one exemplary embodiment.

The following detailed description is directed to synchronous replication among heterogeneous storage nodes. Through the use of the embodiments presented herein, data replication can achieve the performance of high-speed storage units and, at the same time, leverage low-cost and high-capacity backup storage units within the same system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for low latency synchronous replication using n-way routers will be described.

Turning now to FIG. 1, details will be provided regarding an illustrative operating environment for the implementations presented herein, as well as aspects of several software components that provide the functionality described herein for synchronous replication among heterogeneous storage nodes. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
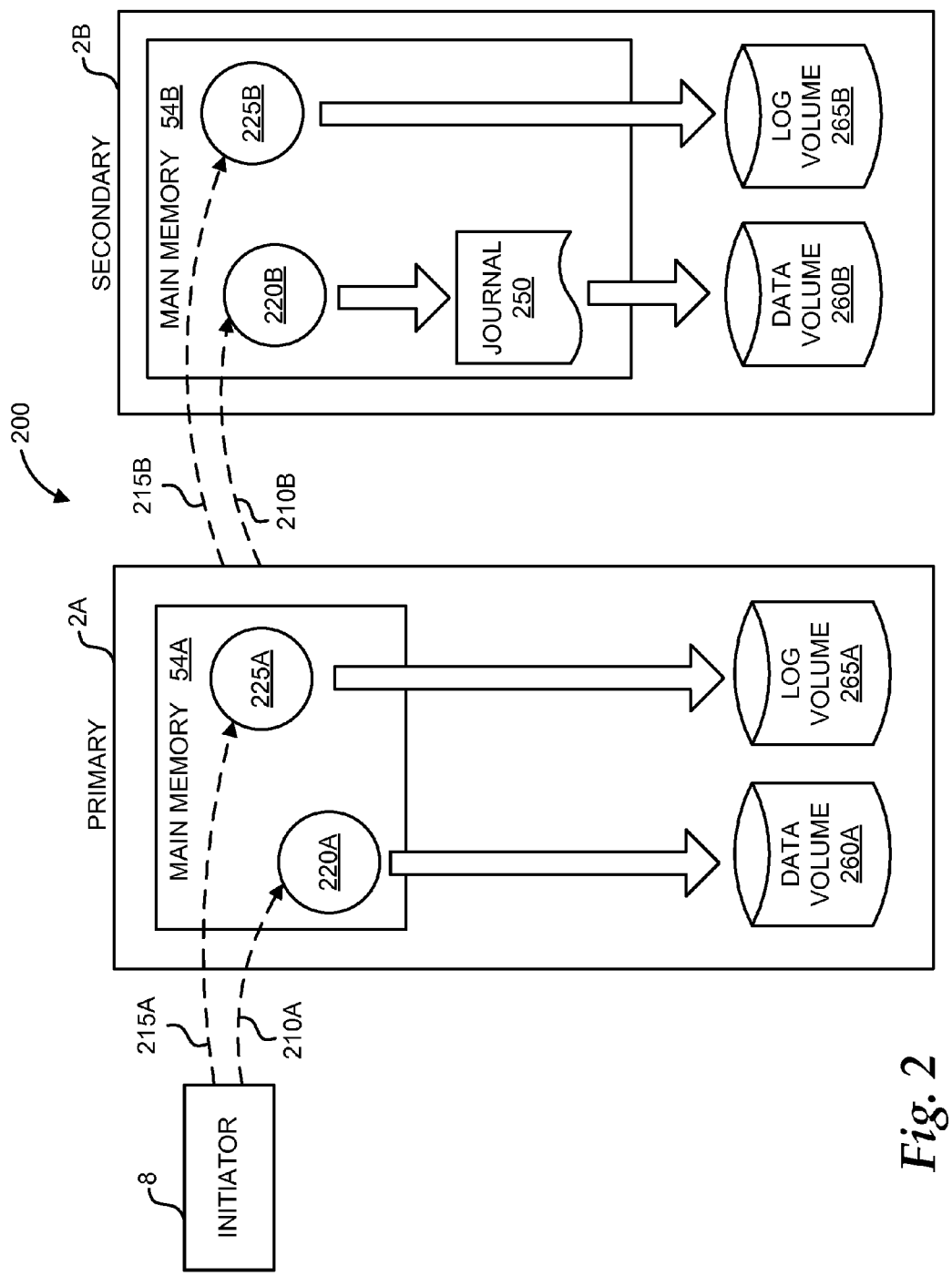
FIG. 2 is a functional architecture diagram illustrating a replicating storage system where the storage nodes employ sequentialized journaling according to one exemplary embodiment.

Referring now to FIG. 2, a replicating storage system 200 is illustrated where the storage nodes 2A-2B employ sequentialized journaling according to one exemplary embodiment. An initiator 8 can generate two different types of I/O operations. The first type is a random access I/O 210A and the second type is a sequential I/O 215A. A random access I/O 210A is a normal data I/O where the data can be stored anywhere on the physical storage media. A sequential I/O 215A is a special type of I/O where consecutive data accesses are stored in physically sequential locations on the physical storage device. Write I/Os are addressed in FIG. 2. The random access write 210A and the sequential write 215A can both issue from the initiator 8 to transfer random access I/O data 220A and the sequential I/O data 225A to the main memory 54A of the primary node. From the main memory 54A of the primary node 2A, the random access I/O data 220A and the sequential I/O data 225A can be replicated to the secondary node 2B and also stored to disk within the primary node 2A.

Since there may be no performance bottlenecks within the high-performance primary storage node 2A, the random access I/O data 220A can be written directly to disk on a data volume 260A and the sequential I/O data 225A can be written directly to disk on a log volume 265A. However, at the secondary node 2B, the low-cost, high-capacity storage devices may impose a bottleneck on random access data writes. A journal 250 to serialize random access data writes into sequential data writes can be used at the secondary 2B to reduce the time of acknowledging the I/O back to the primary 2A and then to the initiator 8. The improved completion time at the secondary 2B can be similar to that provided by the high-speed storage at the primary 2A.

First, a random access replicating I/O 210B can issue the random access I/O data 220A from the main memory 54A of the primary node 2A to be stored as random access I/O data 220B in the main memory 54B of the secondary node 2B. Similarly, a sequential replicating I/O 215B can send the sequential I/O data 225A from the main memory 54A of the primary node 2A to be stored as sequential I/O data 225B in the main memory 54B of the secondary node 2B. Since the sequential I/O data 225A is inherently structured to allow sequential data writes, it can be written directly to disk on a log volume 265B. However, the random access I/O data 220B can be redirected to a journal 250 where I/Os are sequentially logged before being written to disk on a data volume 260B. This sequential logging can cause random access writes to appear, operationally, as sequential data when they are initially written. At a later time, a background process can parse the sequential journal 250 and scatter the I/Os out to their random access locations on the disk without concern for holding up completion of an I/O.

One example of high-performance storage devices to be used at the primary 2A may be SAS drives, while a corresponding low-cost, high-capacity (but possibly slower) drive technology at the secondary 2B may be SATA. The technologies disclosed herein can improve I/O completion time in replicating storage systems that use any type of drive, or storage, technology, not only SAS and SATA. This can be most applicable where a primary node 2A may have less latency than a secondary node 2B, particularly for random access data. In other words, the storage at the secondary 2B may have longer head seek times, and/or data transfer times than the storage at the primary 2A. Using a serializing journal 250 at a secondary 2B having SATA drives can mitigate the random access bottleneck and provide system level performance at near-SAS levels. Again, other types of hard drive, or storage, technology may be used as well.

As illustrated, the serializing mode of operation can be selected on a per-volume basis. Thus, the log volume 265B can still use the normal replication mode, whereas the special serialized journal mode can be used for the data volume 260B. In systems or applications where there is no inherently sequential log data, the log volumes 265A, 265B may not exist and all data writes may be normal random access I/Os 210A, 210B. In such a system, a serializing journal 250 can be applied to all data at the secondary node 2B since all of the data is random access. It should be appreciated that, in general, the serializing of random access data for placement in the journal 250 can occur at the secondary node 2B, or the data can be pre-serialized at the primary 2A and then transferred to the secondary node 2B.

Upon failure at a primary node 2A, failover to a secondary node 2B can occur. There may be a slight delay at failover to process the serialized journal and scatter the data to its proper random locations. This processing must occur before completing the failover to the secondary node 2B in order to fully synchronize data in the secondary 2B to the data stored at the primary 2A. For example, if failover occurred without processing the serialized journal, a read I/O to access data that was recently written might return old data since the recent write I/O may still be bound up in the unprocessed journal 250. Optionally, the secondary node can maintain a separate journal 250 for each primary 2A node that it serves. This can reduce the failover time related to a single primary node failure since a failure at a single primary 2A can require only processing the separate sequential journal 250 that corresponds to the failed primary node 2A.

Figure 3:
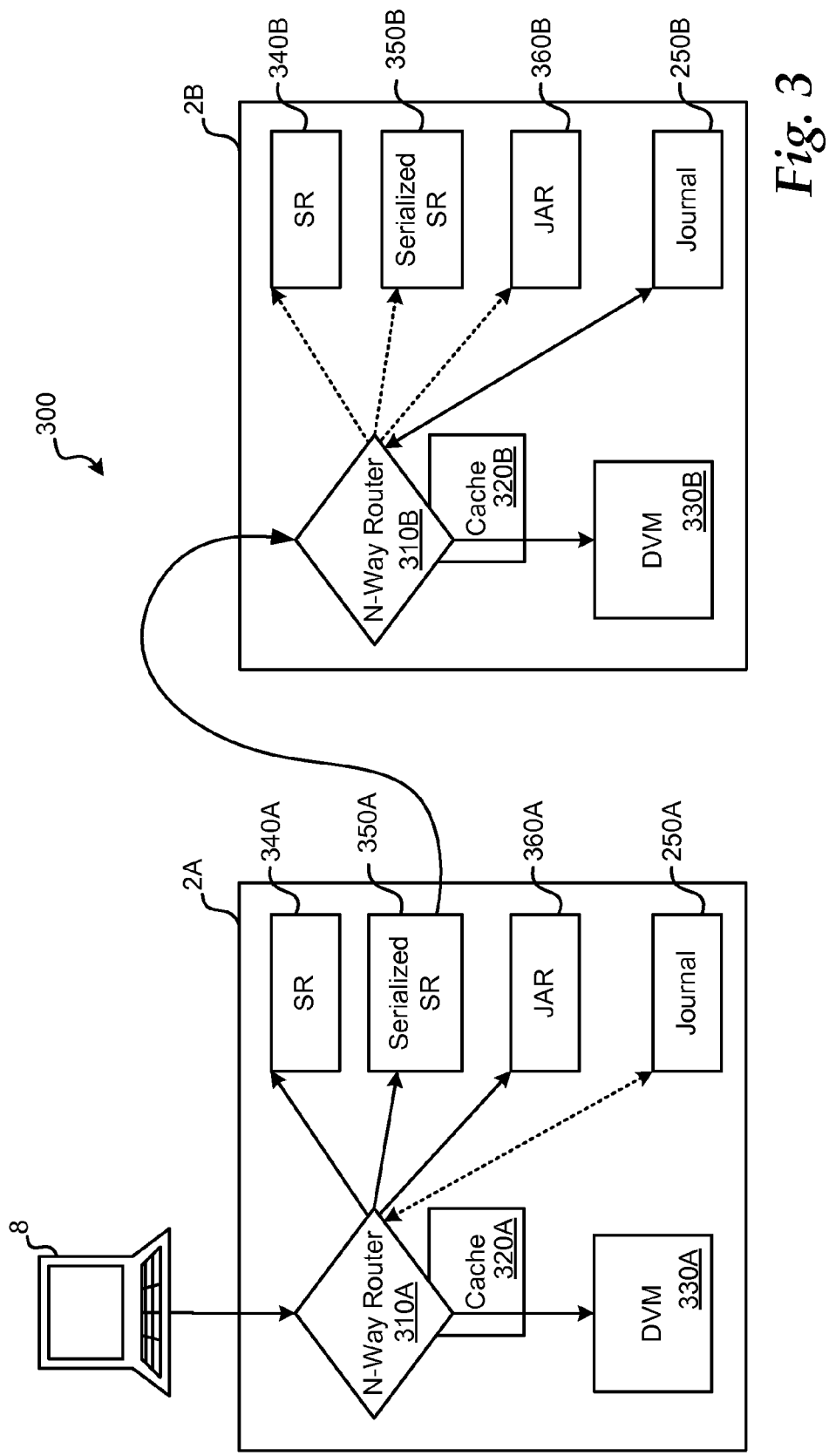
FIG. 3 is a functional block diagram illustrating two replicated nodes with n-way routers according to one exemplary embodiment.

Referring now to FIG. 3, a functional block diagram 300 of two replicated nodes 2A-2B using n-way routers 310A-310B is illustrated according to one exemplary embodiment. An n-way router 310A-310B is a programmable routing module that can route I/Os from different source modules to different destination modules. This routing can be based on the programming or configuration of the n-way router 310A-310B. Examples of different sources may be an initiator 8, another node 2, or the background journal thread module that can read logged data from a journal 250 and write the data to its proper random access locations on the disk(s). Examples of destination modules may be the data volume manager (DVM) module 330A-330B, the synchronous replication (SR) module 340A-340B, the serialized SR module 350A-350B, a journal-assisted replication (JAR) module 360A-360B, or the journal 250A-250B.

At the primary storage node 2A, the n-way router can receive I/Os from an initiator 8 and then route the I/Os to the appropriate destination. The I/O can be routed to the DVM module 330A to be locally processed and written to disk. The I/O can also be replicated to the secondary 2B using various options. Generally, a journal 250A will not be used at the primary node 2A as illustrated by the dotted line. As such, the n-way router 310A in the primary node 2A can be programmed to never route to the local journal 250A. Examples of the various options for replicating to the secondary include the SR module 340A, the serialized SR module 350A, and the JAR module 360A. The SR module 340A can replicate the I/O directly to the secondary 2B for remote processing. The serialized SR module 350A can preprocess several I/Os by packetizing them together prior to replication to the secondary node 2B. This packetizing is addressed in more detail with respect to FIG. 4. The JAR module 360A can preprocess I/Os by writing them to a sequential journal format prior to replication to the secondary 2B. This was discussed with respect to FIG. 2.

At the secondary storage node 2B, the n-way router can receive I/Os from a primary node 2A and then route the I/Os to the appropriate destination. An I/O can be routed to the DVM module 330B to be directly written to disk, or it can be routed to the journal 250B to be sequentially logged as discussed with respect to FIG. 2. Generally, a secondary node 2B will not route I/Os to be replicated. This is illustrated by the dotted lines feeding the SR module 340B, the serialized SR module 350B, and the JAR module 360B. As such, the n-way router 310B in the secondary node 2B can be programmed to never route to these replication modules.

On both the primary node 2A and the secondary node 2B, the n-way router 310A-310B can operate on the cache memory 320A-320B. This can allow local disk writes to be made directly from cache memory 320A-320B.

Continuous data protection (CDP) can be used to protect data on a continuous basis. In most CDP solutions, a backup is made of a file, a folder, or some other storage granularity whenever the storage element is modified. Using the technology disclosed herein, a secondary node 2B can be programmed to act as a log device for CDP. For example, all I/Os can be routed to the secondary 2B to be written to large version of a sequential log that is similar to the journal 250 discussed above. Such a sequential log may use a ring buffer structure so that a sliding window record of recent storage modifications can be maintained. This record can then be used to step back to previous points in storage history to recover from errors or failures.

Figure 4:
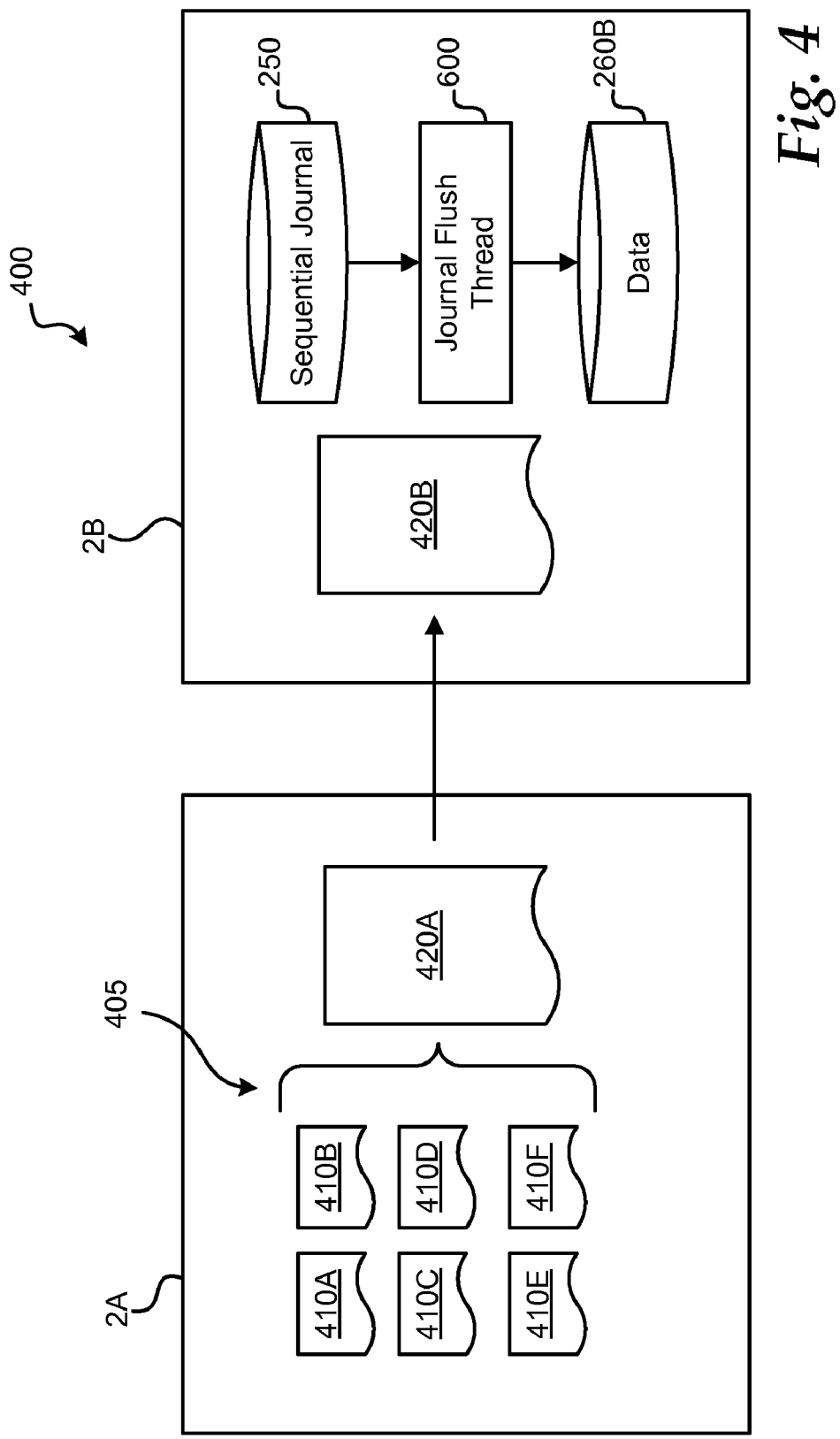
FIG. 4 is a functional block diagram illustrating two replicated nodes providing packetized remote I/Os according to one exemplary embodiment.

Referring now to FIG. 4, a functional block diagram 400 of two replicated nodes 2A-2B using packetized remote I/Os is illustrated according to one exemplary embodiment. The serialized SR module 350A-350B as discussed with respect to FIG. 3 can be used in the primary node 2A to combine multiple outstanding I/Os 410A-410F through a packetizing procedure 405 into one large aggregate I/O 420A. This aggregate I/O 420A can be replicated to the secondary node 2B where the secondary copy of the aggregate I/O 420B can be directly logged to the sequential journal 250. A journal flushing thread 600 can then operate as a background process to parse the original individual I/Os 410A-410F out of the aggregate I/O 420B bundle to be stored appropriately to disk on a data volume 260B. Such packetizing 405 of multiple I/Os can substantially reduce the number of interrupts, context switches, and I/O callbacks performed in line with I/O operations. This reduction can improve storage system performance.

Figure 5:
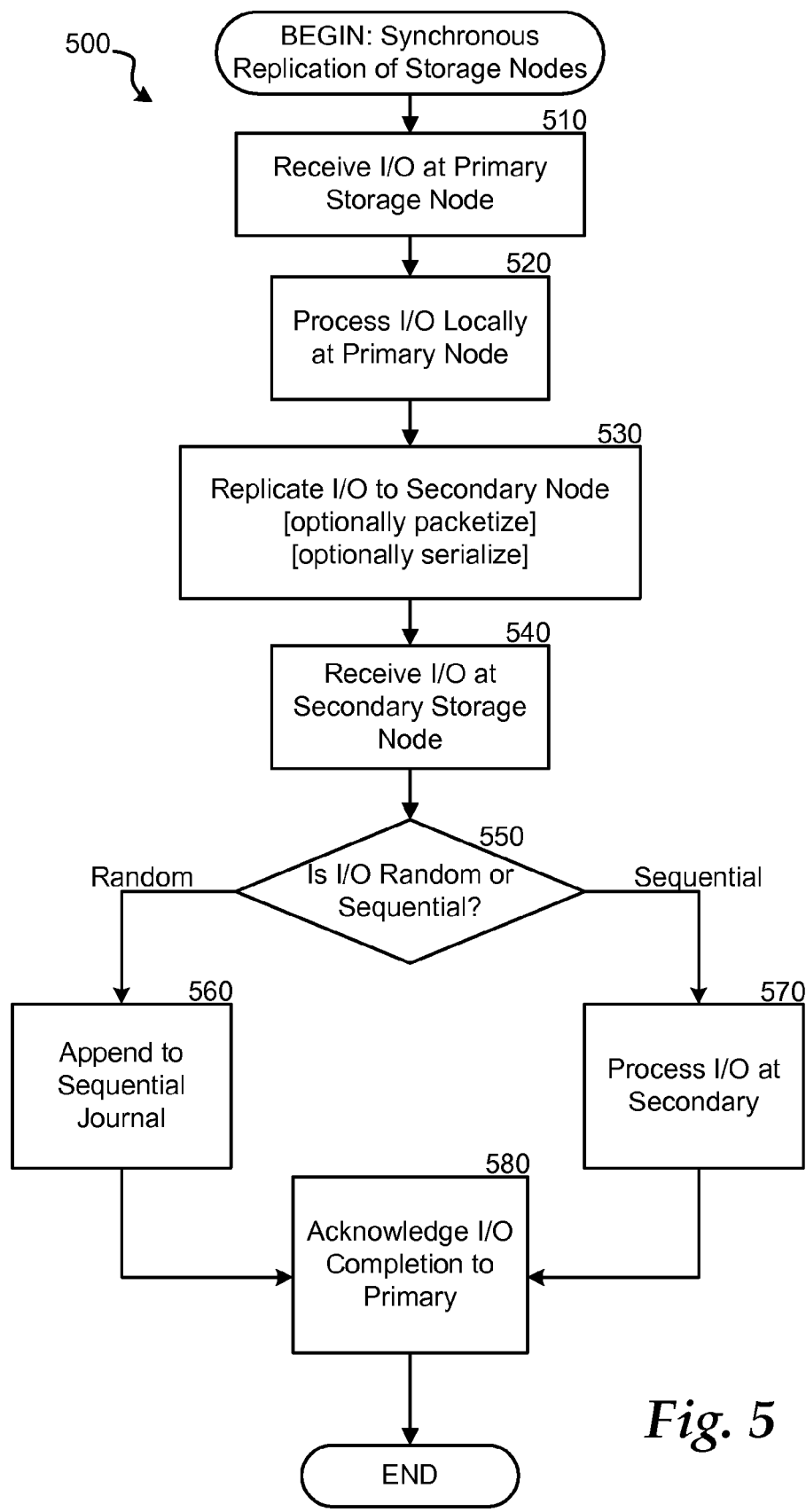
FIG. 5 is a logical flow diagram illustrating a process performed by mirrored storage nodes for the synchronous replication of storage nodes according to one exemplary embodiment.

Turning now to FIG. 5, additional details will be provided regarding the embodiments presented herein for low latency synchronous replication using an n-way router. In particular, FIG. 5 is a flow diagram showing a routine 500 that illustrates aspects of an exemplary process performed by mirrored storage nodes 2A-2B for the synchronous replication of storage I/Os. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 can begin with operation 510 where an I/O is received at a primary storage node 2A. The I/O can originate from an initiator 8. In operation 520, the I/O that was received in operation 510 can be directly processed to the local storage device within the primary node 2A. Since the primary node 2A may comprise high-performance storage devices, all I/Os can be directly processed at the primary 2A without impacting system latency.

In operation 530, the I/O is replicated to the secondary storage node 2B. Prior to this replication, the I/O can optionally be packetized into an aggregate packet 420A with other outstanding I/Os as discussed with respect to the serialized SR module 350A-350B illustrated in FIG. 3. Alternatively, the I/O can optionally be serialized into a sequential journal 250 format prior to replication to the secondary node 2B. This sequential journal 250 preprocessing is discussed with respect to FIG. 3 and the JAR module 360A-360B.

In operation 540, the I/O is received at the secondary storage node 2B where operation 550 can evaluate if the I/O is a random access I/O or a sequential I/O. If the I/O is a random access I/O, the routine 500 can proceed to operation 560 where the I/O can be written to a sequential journal 250. However, if the I/O is determined by operation 550 to be a sequential I/O, the routine 500 can proceed to operation 570 where the I/O can be directly processed to the disk on a log volume 265B.

From either operation 560 or operation 570, the routine 500 can continue to operation 580 where the secondary storage node 2B can acknowledge completion of the I/O back to the primary storage node 2A. This can trigger the primary storage node to acknowledge completion of the I/O back to the original initiator 8. The routine 500 can terminate after operation 580.

Figure 6:
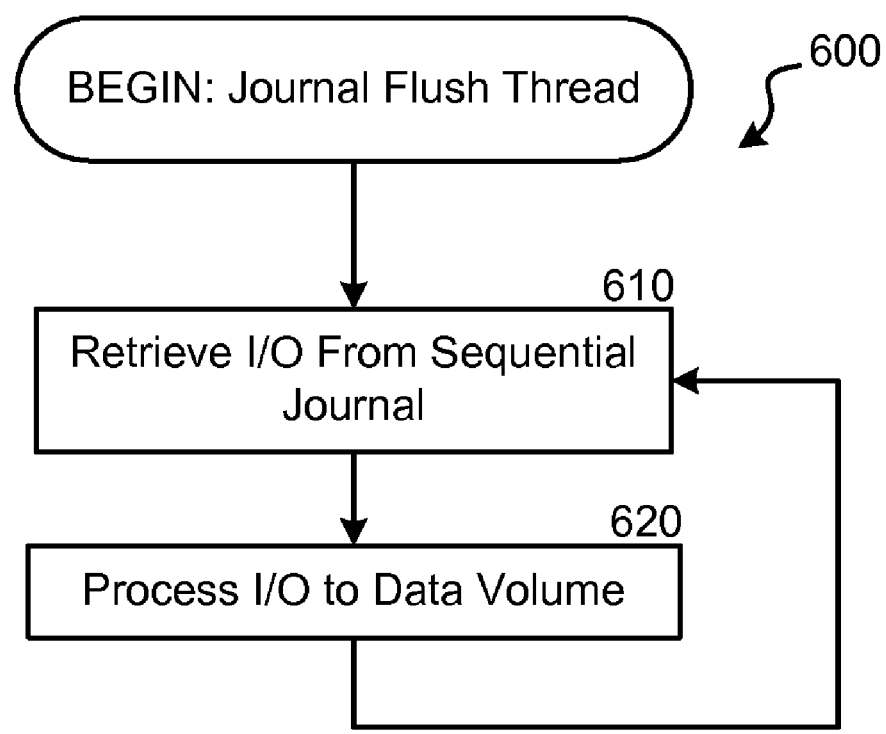
FIG. 6 is a logical flow diagram illustrating a process performed by mirrored storage nodes for background journal flushing according to one exemplary embodiment.

Turning now to FIG. 6, additional details will be provided regarding the embodiments presented herein for low latency synchronous replication using an n-way router. In particular, FIG. 6 is a flow diagram illustrating a routine 600 that shows aspects of an exemplary process performed by mirrored storage nodes 2A-2B for flushing the sequential journal 250 to the data volume 260B. This process may operate as a background process or as a background thread.

The routine 600 can begin with operation 610 where an I/O is retrieved from the sequential journal 250. In operation 620, the I/O that was retrieved in operation 610 is scattered to the originally intended random access locations on the storage device. After operation 620, the routine 600 can return to operation 610 to retrieve the next I/O from the sequential journal 250. The continuous operation, or background operation, of the routine 600 can provide an asynchronous mechanism for properly positioning I/Os on the storage drives that were originally written into the sequential log 250.

Figure 7:
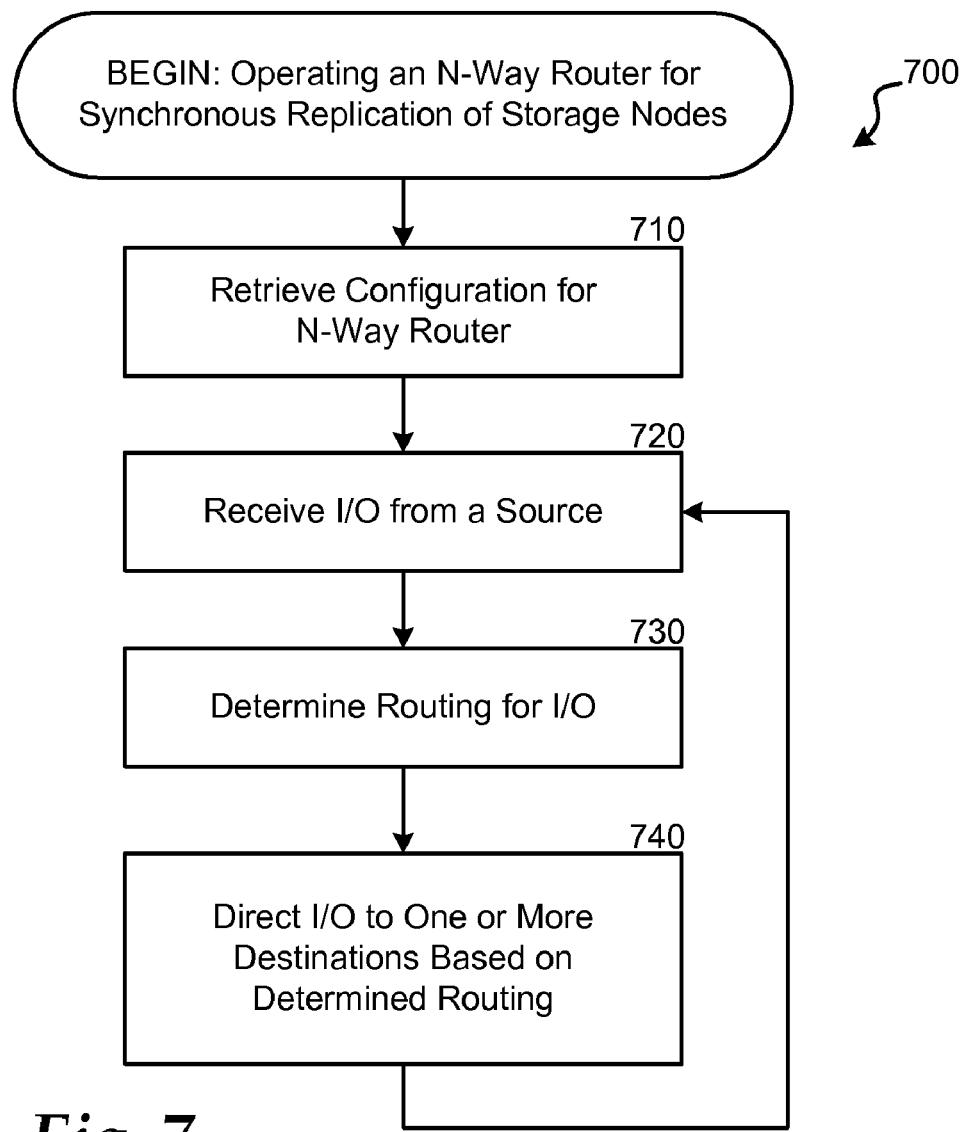
FIG. 7 is a logical flow diagram illustrating a process performed by mirrored storage nodes for operating an n-way router for synchronous I/O replication according to one exemplary embodiment.

Turning now to FIG. 7, additional details will be provided regarding the embodiments presented herein for low latency synchronous replication using an n-way router 310. In particular, FIG. 7 is a flow diagram illustrating a routine 700 that shows aspects of an exemplary process performed by mirrored storage nodes 2A-2B for operating an n-way router 310 for synchronous replication.

The routine 700 can begin with operation 710 where a configuration can be retrieved for an n-way router 310. This configuration may instruct the n-way router 310 about what types of I/Os to direct where according to local storage and replication requirements. For example, at a primary storage node 2A, the n-way router configuration may turn off the local sequential journal 250A and direct all incoming I/Os to be directly stored by the DVM 330A and then replicated by one of the various replicating modules. Similarly, the n-way router 310B configuration at a secondary node 2B may turn off all further outgoing replication and direct I/Os to the DVM 330B or the sequential journal 250B depending on the status of the I/O as random access or sequential.

In operation 720, an incoming I/O is retrieved from a source. For a primary storage node 2A, the source may be an initiator 8, while at a secondary storage node 2B, the source may be a primary storage node 2A.

In operation 730, the proper routing can be determined for the incoming I/O that was retrieved in operation 720. The correct routing may be determined by evaluating what type of I/O is in play and how the n-way router 310 is configured to handle the routing of such an I/O. These handling parameters for the n-way router 310 may be established according to the n-way router 310 configuration information that was retrieved in operation 710.

In operation 740, the I/O is directed to one or more destinations according to routing established in operation 730. Some I/Os may be directed to a single destination such as a local disk store, while other I/Os may be multiply directed to achieve both local storage and remote replication. After operation 740, the routine 700 may loop back to operation 720 to receive the next incoming I/O operation from the source.

Figure 8:
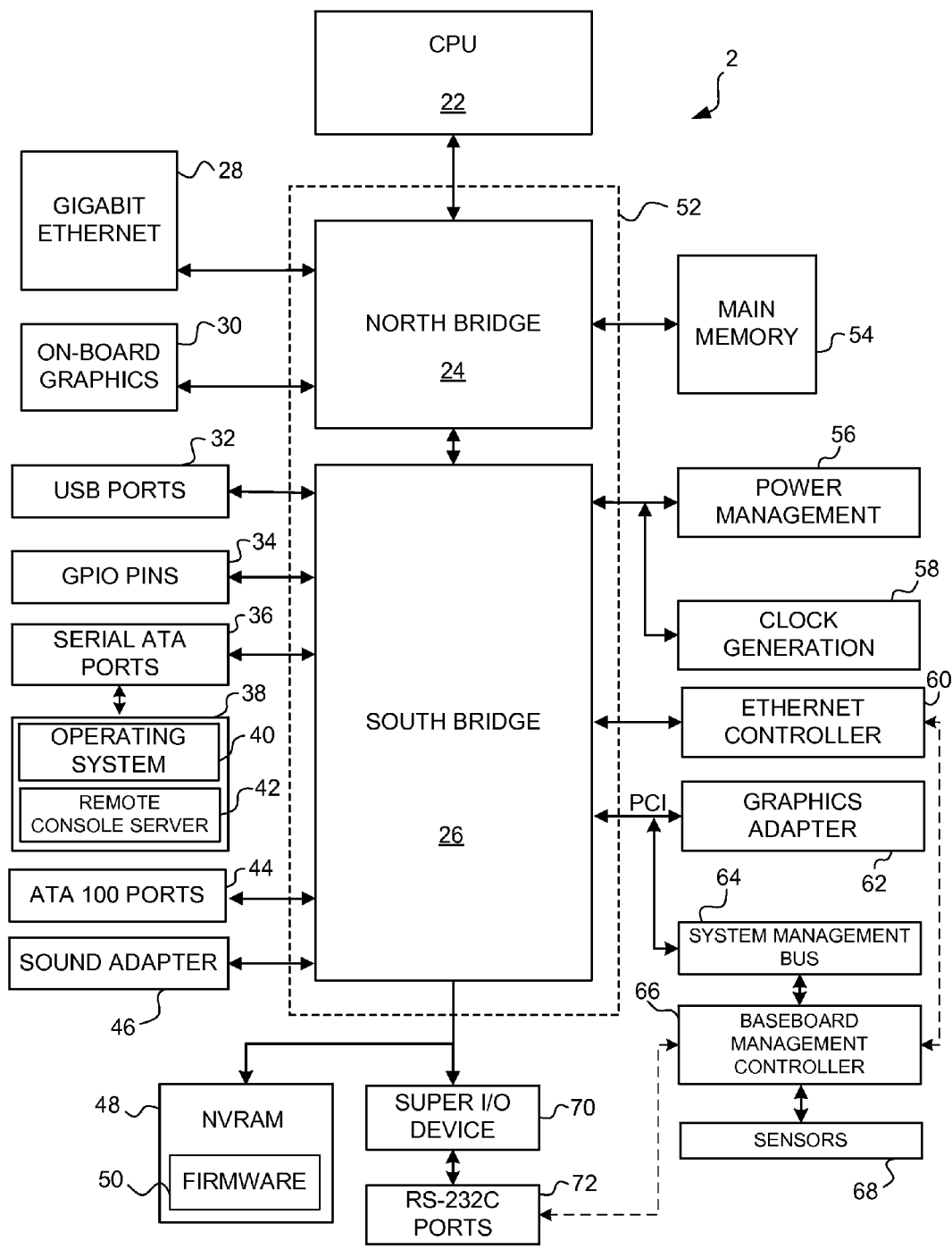
FIG. 8 is a computer architecture diagram illustrating a computer hardware architecture for a computing system capable of serving as a storage node according to one exemplary embodiment.

FIG. 8 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 8 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 8, may include other components that are not explicitly shown in FIG. 8, or may utilize an architecture completely different than that shown in FIG. 8.

Based on the foregoing, it should be appreciated that technologies for low latency synchronous storage replication using n-way routers are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for routing an Input/Output operation (I/O) to support low latency synchronous replication among heterogeneous storage nodes, the method comprising:
   receiving the I/O from a source;
   routing, within a primary storage node, the I/O to a first data volume manager for local storage;
   routing, within the primary storage node, the I/O to a replicating module;
   routing, within a secondary storage node, the I/O to a journaling module; and
   routing, within the secondary storage node, the I/O from the journaling module to a second data volume manager for local storage, wherein the replicating module is operable to serialize a plurality of I/Os into a sequential journal structure prior to transmitting the sequential journal structure to the secondary storage node.

2. The method of claim 1, wherein the primary storage node has a lower latency than the secondary storage node.

3. The method of claim 1, wherein the primary storage node comprises an SAS hard drive and the secondary storage node comprises a SATA hard drive.

4. The method of claim 1, wherein the replicating module is operable to packetize a plurality of I/Os into an aggregate I/O prior to transmitting the aggregate I/O to the secondary storage node.

5. The method of claim 1, further comprising routing the I/O to a sequential log volume in response to the I/O being a sequential I/O.

6. A method for replicating an Input/Output operation (I/O) from a first storage node to a second storage node, the method comprising:
   receiving the I/O at the first storage node;
   processing the I/O at the first storage node to store data from the I/O in the first storage node;
   replicating the I/O to the second storage node from the first storage node;
   storing the operation I/O to a sequential journal in the second storage node; and
   retrieving the I/O from the sequential journal to store the data from the I/O in the second storage node, wherein replicating the I/O to the second storage node comprises packetizing a plurality of I/Os into an aggregate I/O prior to transmitting the aggregate I/O to the second storage node.

7. The method of claim 6, wherein the first storage node has a lower latency than the second storage node.

8. The method of claim 6, wherein the first storage node comprises an SAS hard drive and the second storage node comprises a SATA hard drive.

9. The method of claim 6, wherein replicating the I/O to the second storage node comprises serializing a plurality of I/Os into a sequential journal block prior to transmitting the sequential journal block to the second storage node.

10. The method of claim 6, wherein retrieving the I/O from the sequential journal to store the data from the I/O in the second storage node is performed as a background operation.

11. The method of claim 6, further comprising providing continuous data protection to the first storage node by logging, to the second storage node, a data modification made on the first storage node.

12. A non-transitory computer storage medium having computer-executable instructions stored thereon which, when executed by a computer system, cause the computer system to:
   determine if execution is on a primary storage node or a secondary storage node;
   receive an Input/Output operation from a source;
   route the I/O to a first data volume manager for local storage in response to determining that execution is on the primary storage node;
   route the I/O to a replicating module in response to determining that execution is on the primary storage node;
   route the I/O to a journaling module in response to determining that execution is on the secondary storage node; and
   route the I/O from the journaling module to a second data volume manager for local storage in response to determining that execution is on the secondary storage node, wherein the replicating module is operable to packetize a plurality of I/Os into an aggregate I/O prior to transmitting the aggregate I/O to the secondary storage node.

13. The tangible computer storage medium of claim 12, wherein the primary storage node has a lower latency than the secondary storage node.

14. The tangible computer storage medium of claim 12, wherein the primary storage node comprises an SAS hard drive and the secondary storage node comprises a SATA hard drive.

15. The tangible computer storage medium of claim 12, wherein the replicating module is operable to serialize a plurality of I/Os into a sequential journal structure prior to transmitting the sequential journal structure to the secondary storage node.

16. The tangible computer storage medium of claim 12, wherein routing the I/O from the journaling module to the local data volume manager for local storage is performed as an asynchronous I/O.

17. The tangible computer storage medium of claim 12, further causing the computer system to provide continuous data protection to the primary storage node by logging, to the secondary storage node, a data modification made on the primary storage node.

* * * * *